US006137234A

United States Patent [19]

Willaert et al.

[11] Patent Number: 6,137,234

[45] Date of Patent: Oct. 24, 2000

[54] CIRCUIT ARRANGEMENT

[75] Inventors: Jürgen M. A. Willaert, Eindhoven, Netherlands; Chin Chang, Yorktown Heights, N.Y.

[73] Assignee: U.S. Philips Corporation, New York, N.Y.

[21] Appl. No.: 09/421,355

[22] Filed: Oct. 18, 1999

[51] Int. Cl.[7] .............................. H05B 37/02; H02M 5/45

[52] U.S. Cl. .......................................... 315/209 R; 363/37

[58] Field of Search ................................. 363/16, 17, 34, 363/37, 95, 97, 131, 132; 315/209 R, 210–213, 219, 224, 226, 241, 242, 244

[56] References Cited

U.S. PATENT DOCUMENTS

| | | | |
|---|---|---|---|
| 5,070,276 | 12/1991 | Burgholte et al. | 315/209 R |
| 5,438,243 | 8/1995 | Kong | 315/219 |
| 5,781,418 | 7/1998 | Chang et al. | 363/16 |
| 6,043,606 | 3/2000 | Arts et al. | 315/94 |
| 6,049,177 | 4/2000 | Felper | 315/219 |

*Primary Examiner*—Matthew Nguyen
*Attorney, Agent, or Firm*—Bernard Franzblau

[57] ABSTRACT

A circuit arrangement for operating two or more discharge lamps in parallel, includes a transformer in a resonant load circuit. Each of the lamps is part of a series arrangement of the lamp and a capacitor. The operating frequency is chosen below the frequency for which the phase shift between the voltage and current in the load circuit is minimal. During operation, the amplitude of the current in the load circuit is relatively low so that power dissipation in the load circuit is also very low.

13 Claims, 3 Drawing Sheets

CIRCUIT ARRANGEMENT

SUMMARY OF INVENTION

The invention relates to a circuit arrangement for igniting and supplying a discharge lamp, comprising

- an inverter for generating a high-frequency output voltage at a frequency f from a DC power supply voltage, provided with inverter input terminals for connection of a DC power supply source supplying the DC power supply voltage, and inverter output terminals,
- a resonant circuit coupled to the inverter output terminals and comprising a series arrangement of a first inductive element and a first capacitive element,
- a load circuit shunting the first capacitive element and comprising a transformer having a primary winding and a secondary winding, and a lamp circuit which is provided with a series arrangement of lamp connection terminals and a second capacitive element and shunts the secondary winding.

A circuit arrangement of this type is known from U.S. Pat. No. 5,781,418. The known circuit arrangement is often provided with a plurality of lamp circuits each shunting the secondary winding and being formed by a series arrangement of a capacitive element and lamp connection terminals. The dimensioning of the known circuit arrangement is chosen to be such that, during lamp operation, the voltage across the secondary winding of the transformer has a considerably higher amplitude than the amplitude of the voltage across each lamp. This voltage across the secondary winding hardly changes when, during lamp operation, one of the discharge lamps is removed from the relevant lamp circuit. When another discharge lamp is placed in the relevant circuit again before this discharge lamp ignites, the amplitude of the voltage across this discharge lamp is equal to the amplitude of the voltage across the secondary winding. Under the influence of this voltage, the new discharge lamp placed in the circuit ignites substantially immediately. After ignition, the discharge lamp, and hence the capacitive element arranged in series therewith, conveys a current. Each lamp circuit is dimensioned in such a way that, during operation of the discharge lamp, the amplitude of the voltage across the capacitive element is considerably larger than the amplitude of the voltage across the discharge lamp. A first considerable advantage of the known circuit arrangement is that discharge lamps which are fed by the circuit arrangement can be exchanged during operation of the circuit arrangement. A second advantage is that, if one of the discharge lamps no longer conveys a current due to a defect, the other discharge lamps continue to operate in a stable manner. A drawback of the known circuit arrangement is, however, that at a given lamp power consumption, the amplitude of the current in the inverter and in the resonant circuit is relatively high so that relatively high losses occur.

SUMMARY OF THE INVENTION

It is an object of the invention to provide a circuit arrangement for supplying a discharge lamp in which, during operation, only relatively small losses occur in the resonant circuit and the inverter, while maintaining the above-mentioned advantages.

According to the invention, a circuit arrangement of the type described in the opening paragraph is therefore characterized in that the frequency f has a lower value during stationary lamp operation than the value fmin for which the phase shift between the current in the resonant circuit and the voltage across the resonant circuit is minimal.

Generally, it holds for a circuit arrangement as mentioned in the opening paragraph that a relatively large power dissipation occurs in the inverter at a relatively low value of the phase shift between the current in the resonant circuit and the voltage across the resonant circuit. This phase shift, as a function of the frequency f, has a minimum for the frequency fmin. If the operating frequency is chosen to be proximate to fmin, the power dissipation in the inverter is relatively high. This high power dissipation can only be avoided by choosing the operating frequency of the circuit arrangement to be either considerably higher than fmin, or considerably lower than fmin. In the known circuit arrangement, the operating frequency of the circuit arrangement is chosen at a higher value than fmin. This choice is related to the fact that the known circuit arrangement, immediately after it is put into operation, oscillates at a frequency which is considerably higher than the frequency for stationary lamp operation. Subsequently, the frequency is reduced during a given time interval to the value for stationary lamp operation. During this reduction of the frequency, the amplitude of the voltage across the discharge lamp increases until it ignites. Since the frequency in the case of stationary lamp operation is considerably higher than fmin, a high power dissipation is avoided in the inverter during reduction of the frequency. In a circuit arrangement according to the invention, however, the stationary operating frequency is lower than fmin. In fact, the stationary operating frequency is chosen to be at a value which is so much lower than fmin that a high power dissipation in the inverter is avoided. It has been found that, under these conditions and at an equal lamp power, the current in the inverter and the resonant circuit has a considerably lower amplitude than for frequency values which are considerably higher than fmin, as used in the known circuit arrangement. As a result, the power dissipation in the inverter and the resonant circuit is relatively low.

In a preferred embodiment of a circuit arrangement according to the invention, the inverter is also provided with a circuit section I for raising the value of the frequency f after putting the circuit arrangement into operation. Immediately after putting this preferred embodiment of the circuit arrangement into operation, the operating frequency has a relatively low value. At this relatively low value of the operating frequency, the voltage across a discharge lamp connected to the circuit arrangement is relatively low so that the discharge lamp does not ignite. By maintaining, for example, the operating frequency at this relatively low value during a first time interval, the electrodes of the discharge lamp can be preheated (provided that the circuit arrangement comprises means for heating the electrodes). Subsequently, the frequency is raised during a second time interval to the value at stationary lamp operation. During this increase, the voltage across the discharge lamp gradually increases until it ignites. It has been found that the discharge lamp has a relatively long lifetime in this ignition mode, notably when the electrodes are preheated. Since the frequency is considerably lower than fmin throughout the second time interval, there is no relatively high power dissipation in the inverter during this second time interval.

Satisfactory results have been found for embodiments of a circuit arrangement according to the invention, in which the inverter is provided with

- a series arrangement of two switching elements,
- a control circuit coupled to the switching elements for alternately rendering the switching elements conducting and non-conducting at the frequency f, and in which the circuit section I forms part of the control circuit.

Satisfactory results have notably been found for those embodiments in which the circuit arrangement further comprises rectifier means having rectifier output terminals coupled to the inverter input terminals, and connection terminals for connection to terminals of an AC power supply source for generating the DC power supply voltage from an AC power supply voltage, a buffer circuit comprising a third capacitive element interconnecting the inverter input terminals, a first feedback circuit comprising a series arrangement of a first unidirectional element and a second unidirectional element connecting a rectifier output terminal to an inverter input terminal, and in which a common point of the switching elements is connected to a common point of the first and the second unidirectional element via the first inductive element and via the load circuit. These embodiments may be supplied from the AC power supply source. Without compensating measures, the presence of the third capacitive element would considerably reduce the power factor of the circuit arrangement. However, this effect is compensated to a considerable extent by means of power feedback which is realized in this embodiment by the first feedback circuit, the resonant circuit and the load circuit. It has been found to be advantageous to shunt the second unidirectional element with a capacitive circuit comprising a fourth capacitive element. The power feedback in these embodiments can be improved because the first feedback circuit is shunted by a second feedback circuit comprising a series arrangement of a third unidirectional element and a fourth unidirectional element, and a common point of the third and the fourth unidirectional element is connected to one end of the resonant circuit. The power feedback in such embodiments is realized by the first to fourth unidirectional elements, the load circuit and the resonant circuit. It has appeared that it is possible to optimize the power feedback by adjusting the phase difference between the current in the resonant circuit and the current in the load circuit. This phase difference can be adjusted by dimensioning the assembly of transformer and lamp circuits. This dimensioning determines the impedance of the assembly of transformer and lamp circuits. More particularly, this impedance can be adjusted by suitably choosing the magnetizing inductance of the transformer.

BRIEF DESCRIPTION OF THE DRAWING

These and other aspects of the invention are apparent from and will be elucidated with reference to the embodiments described hereinafter.

In the drawings.

DESCRIPTION OF THE PREFERRED EMBODIMENTS

Figure 1:
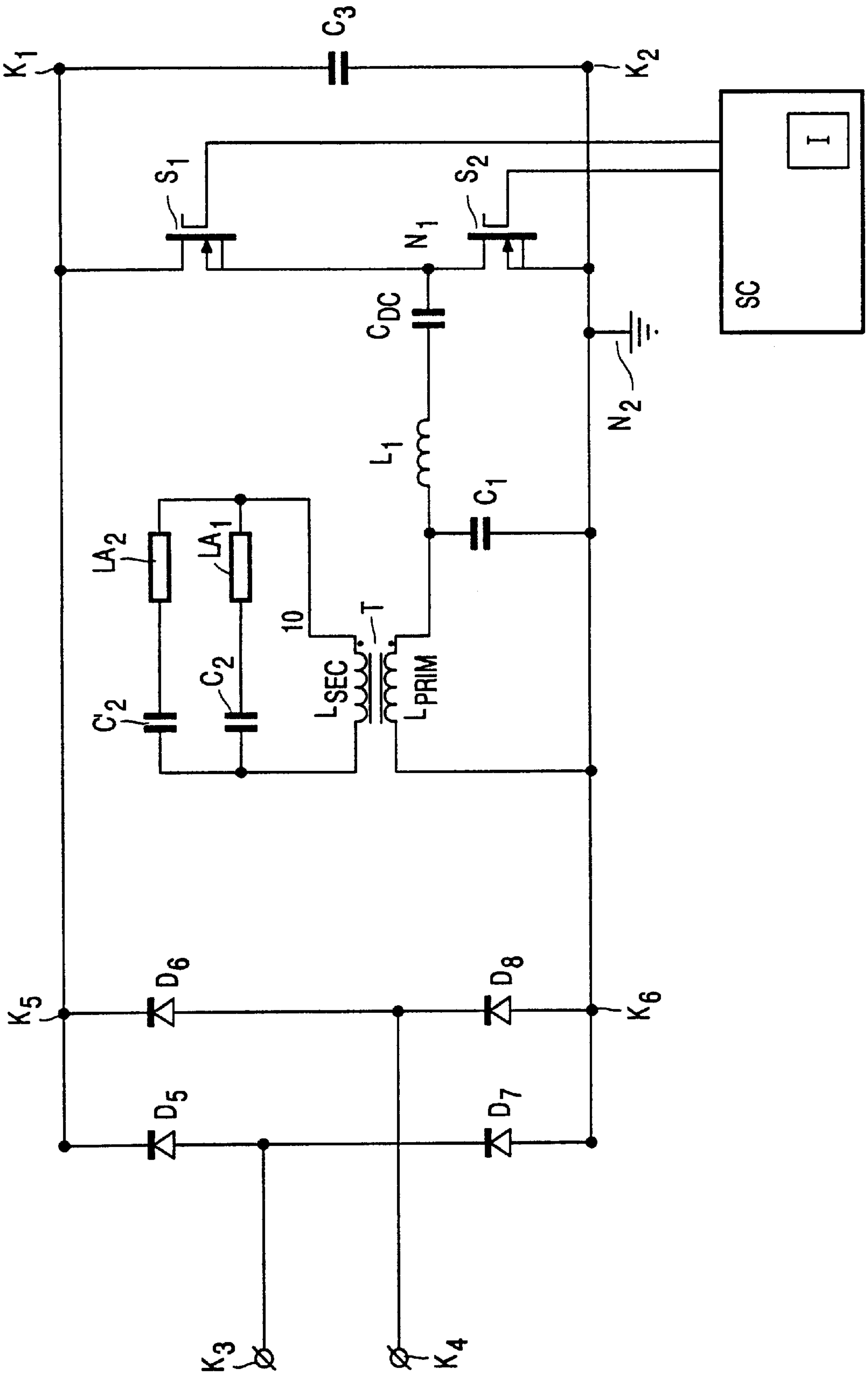
FIG. 1 shows diagrammatically a first embodiment of a circuit arrangement according to the invention, with two discharge lamps connected thereto.

In FIG. 1, the terminals K3 and K4 denote connection terminals for connection to an AC power supply source. Connection terminals K3 and K4 constitute the input terminals of a diode bridge which is constituted by diodes D5–D8. In this embodiment, the diode bridge constitutes rectifier means for generating a DC power supply voltage from an AC power supply voltage. Rectifier output terminals K5 and K6 of the diode bridge are connected to inverter input terminals K1 and K2, respectively. Inverter input terminals K1 and K2 are connected by means of capacitor C3 which constitutes a third capacitive element and a buffer circuit in this embodiment. Capacitor C3 is shunted by a series arrangement of switching elements S1 and S2. Respective control electrodes of the switching elements are connected to respective outputs of circuit section SC. In this embodiment, circuit section SC constitutes a control circuit for alternately rendering the switching elements S1 and S2 conducting and non-conducting at a frequency f. The control circuit comprises a circuit section I for raising the value of the frequency f after the circuit arrangement has been put into operation. A common point N1 of switching element S1 and switching element S2, and an end N2 of switching element S2 remote from N1 constitute inverter output terminals in this embodiment. The inverter output terminals N1 and N2 are interconnected by means of a series arrangement of capacitor Cdc, coil L1 and capacitor C1. In this embodiment, coil L1 and capacitor C1 constitute a first inductive element and a first capacitive element, respectively. Cdc is a DC blocking capacitor and has a relatively high capacitance with respect to capacitor C1. Capacitor C1 is shunted by the primary winding Lprim of transformer T. Lsec is a secondary winding which forms part of transformer T and is magnetically coupled to primary winding Lprim. Secondary winding, Lsec is shunted by a first lamp circuit constituted by a series arrangement of discharge lamp La1 and capacitor C2 and also by a second lamp circuit which is constituted by a series arrangement of discharge lamp La2 and capacitor C2'. In this embodiment, each of the two capacitors C2 and C2' constitutes a second capacitive element. Discharge lamps La1 and La2, capacitors C2 and C2' and transformer T jointly constitute a load circuit which shunts capacitor C1.

The embodiment shown in FIG. 1 operates as follows.

If connection terminals K3 and K4 are connected to a power supply source supplying an AC power supply voltage, this power supply voltage is rectified by the diode bridge to a DC voltage having a substantially constant amplitude which is present across capacitor C3. Circuit section SC renders the switching elements S1 and S2 alternately conducting and non-conducting, at the frequency f. As a result, a substantially square-wave voltage at the frequency f and an amplitude which is equal to the amplitude of the voltage across capacitor C3 is present at the common point N1 of the two switching elements. Under the influence of this substantially square-wave voltage, an alternating current at the frequency f flows in the resonant circuit and in the load circuit. Immediately after the circuit arrangement is put into operation, the frequency f has a relatively low value. At this relatively low value, the voltage across the lamps La1 and La2 is relatively low so that they do not ignite. The relatively low value of the frequency f may be maintained during a first time interval. During this first time interval, the electrodes of the lamp can be preheated with means (not shown) for preheating the electrodes. The first time interval may, however, also be chosen to be substantially equal to zero. Subsequently, the value of the frequency f is raised during a second time interval. During this increase of the frequency, the amplitude of the voltage across the lamps increase until these lamps ignite. For each value of the frequency range covered during the increase, the phase shift between the current in the resonant circuit and the voltage at output terminal N1 is high enough to avoid a relatively large power dissipation in the inverter. The highest value of the frequency f is the value maintained by the circuit section SC during stationary lamp operation. This frequency is lower than the frequency for which the phase shift between the current in the resonant circuit and the voltage across the resonant circuit is minimal. As a result, the current in the resonant circuit has a relatively low amplitude so that power dissipation in the inverter and in the resonant circuit is relatively low.

It is to be noted that the load circuit may be dimensioned in such a way that the impedance at the stationary operating frequency is approximately ohmic. More particularly, this dimensioning can be realized by structuring of the transformer such that the magnetizing inductance has a value such that the impedance of the load circuit is ohmic.

Figure 2:
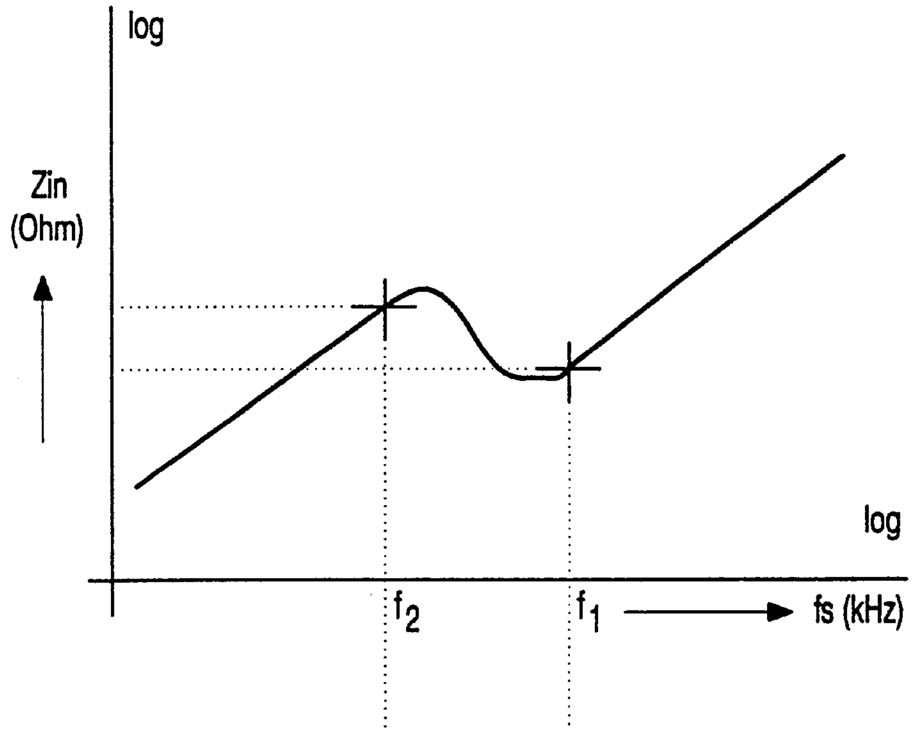
FIG. 2 shows the total impedance of the resonant circuit and the load circuit, together with the embodiment shown in FIG. 1, as a function of the frequency f.

In FIG. 2, the operating frequency f is logarithmically plotted on the horizontal axis. The input impedance Zin of a circuit arrangement as shown in FIG. 1 is logarithmically plotted in arbitrary units on the vertical axis. At frequencies f1 and f2 indicated on the horizontal axis, the power consumption of the discharge lamps supplied by the circuit arrangement is equal. In this case, f1 is the operating frequency as used in the known circuit arrangement, whereas f2 is the operating frequency as used in a circuit arrangement according to the invention. However, it can be seen that input impedance Zin of the circuit arrangement has a considerably higher value at frequency f2 than at frequency f1, so that the power dissipation in the inverter and the resonant circuit is considerably lower at frequency f2.

Figure 3:
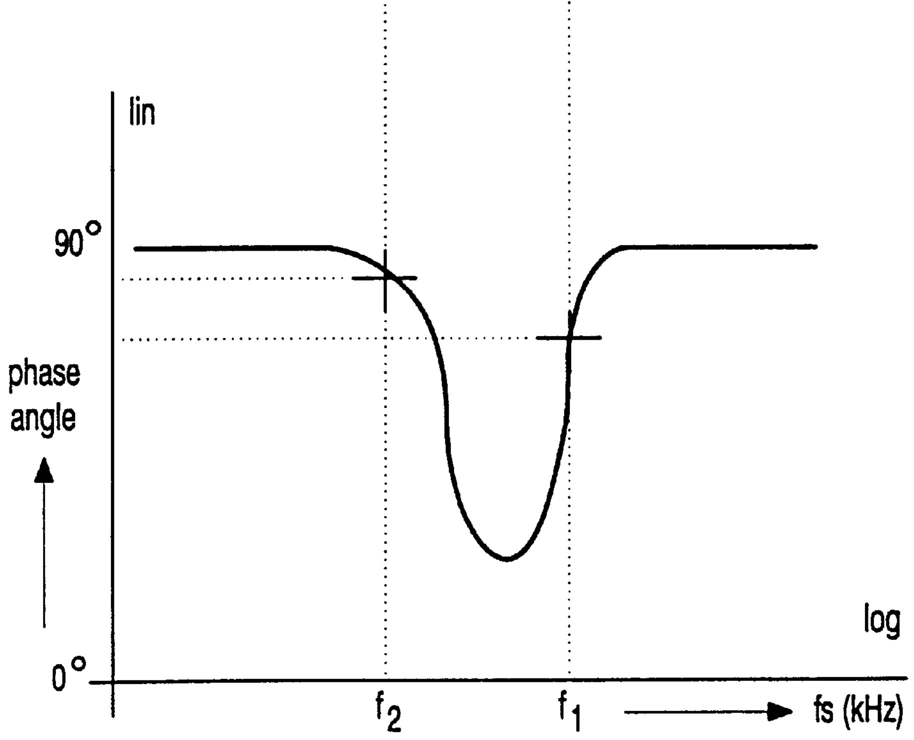
FIG. 3 shows the phase shift between the current in the resonant circuit and the voltage across the resonant circuit of the circuit arrangement shown in FIG. 1, as a function of the frequency f.

In FIG. 3, the operating frequency f is logarithmically plotted on the horizontal axis. The phase shift between the current through the resonant circuit and the voltage across the resonant circuit of a circuit arrangement as shown in FIG. 1 is plotted in degrees on the vertical axis. Similarly as in FIG. 2, the frequencies f1 and f2 are indicated on the horizontal axis. It can be seen that, for a large part of the operating frequency values between f2 and f1, the phase difference is so small that a considerable power dissipation would occur in the inverter.

Figure 4:
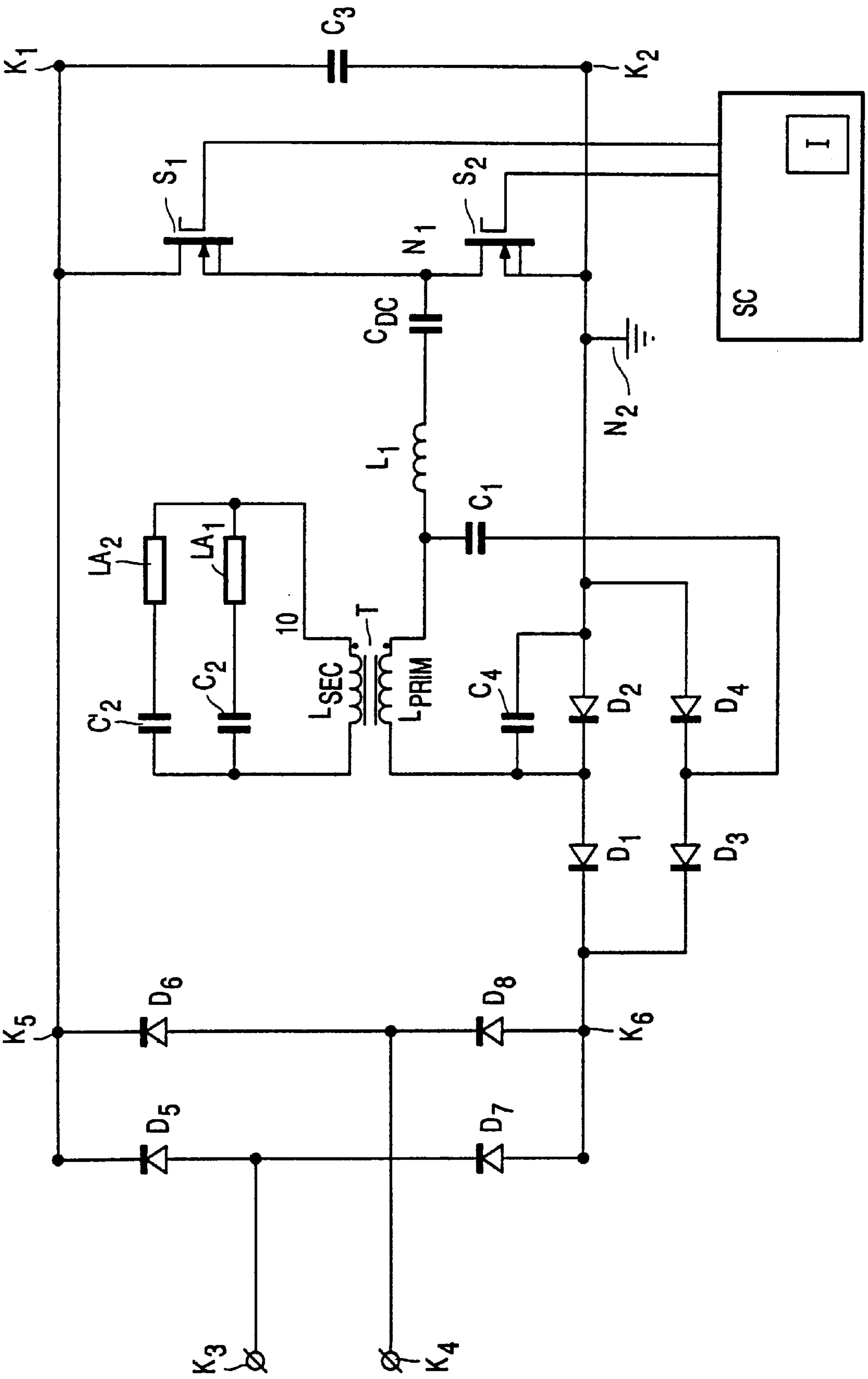
FIG. 4 shows diagrammatically a second embodiment of a circuit arrangement according to the invention, with two lamps connected thereto.

The embodiment shown in FIG. 4 partly corresponds to the embodiment shown in FIG. 1. Corresponding components and circuit sections are denoted by the same references. In the embodiment shown in FIG. 4, a double power feedback is present. This double power feedback is realized by four diodes D1–D4, the resonant circuit and the load circuit. In this embodiment, diodes D1–D4 constitute first to fourth unidirectional elements. Rectifier output terminal K6 is connected to inverter input terminal K2 by means of a series arrangement of diodes D1 and D2. In this embodiment, the series arrangement of diodes D1 and D2 constitutes a first feedback circuit. A common point N1 of the two switching elements S1 and S2 is connected to a common point of diode D1 and diode D2 via the first inductive element and via the load circuit. Diode D2 is shunted by capacitor C4 which, in this embodiment, constitutes both a capacitive circuit and a fourth capacitive element. The series arrangement of diode D1 and diode D2 is shunted by a series arrangement of diode D3 and diode D4. This series arrangement constitutes a second feedback circuit in this embodiment. One end of the resonant circuit, constituted by a side of capacitor C1 remote from a coil L1, is connected to a common point of diode D3 and diode D4.

The operation of the embodiment shown in FIG. 4 largely corresponds to that of the embodiment shown in FIG. 1. The double power feedback operates as follows. Since an alternating current at frequency f flows in the resonant circuit and in the load circuit during operation of the circuit arrangement, a pulsatory voltage at frequency f is present both at the common point of diodes D1 and D2, and at the common point of diodes D3 and D4. Due to the presence of these pulsatory voltages, the circuit arrangement takes up current from the AC power supply source, also when the instantaneous amplitude of the AC power supply voltage is lower than the amplitude of the voltage across capacitor C3. Due to this operation of the double power feedback, the circuit arrangement shown in FIG. 4 has a relatively high power factor, and the quantity of total harmonic distortion (THD) caused by the circuit arrangement is relatively low. The power feedback can be optimized by adjusting the phase shift between the current in the resonant circuit and the current in the load circuit. This phase shift may be more particularly influenced by suitably choosing the magnetizing inductance of the transformer. It was found that the power factor for many practical embodiments of a circuit arrangement as shown on FIG. 4 was higher than 0.9, while the THD was smaller than 10%.

What is claimed is:

1. A circuit arrangement for igniting and supplying a discharge lamp, comprising:

an inverter for generating a high-frequency output voltage at a frequency f from a DC power supply voltage, provided with inverter input terminals for connection of a DC power supply source supplying the DC power supply voltage, and inverter output terminals, a resonant circuit coupled to the inverter output terminals and comprising a series arrangement of a first inductive element and a first capacitive element, a load circuit shunting the first capacitive element and comprising a transformer having a primary winding and a secondary winding, and a lamp circuit which is provided with a series arrangement of lamp connection terminals and a second capacitive element and shunts the secondary winding, wherein the frequency f has a lower value during stationary lamp operation than the value fmin for which the phase shift between the current in the resonant circuit and the voltage across the resonant circuit is minimal.

2. A circuit arrangement as claimed in claim 1, wherein the inverter further comprises a circuit section I for raising the value of the frequency f after putting the circuit arrangement into operation.

3. A circuit arrangement as claimed in claim 1, wherein the inverter further comprises;

a series arrangement of two switching elements, a control circuit coupled to the switching elements for alternately rendering the switching elements conducting and non-conducting at the frequency f, and wherein a circuit section I for raising the value of the frequency f after putting the circuit arrangement into operation forms a part of the control circuit.

4. A circuit arrangement as claimed in claim 3, which further comprises;

rectifier means having rectifier output terminals coupled to the inverter input terminals, and connection terminals for connection to terminals of an AC power supply source for generating the DC power supply voltage from an AC power supply voltage, a buffer circuit comprising a third capacitive element and interconnecting the inverter input terminals, a first feedback circuit comprising a series arrangement of a first unidirectional element for a second unidirectional element for connecting a rectifier output terminal to an inverter input terminal, and wherein a common point of the switching elements is connected to a common point of the first and the second unidirectional element via the first inductive element and via the load circuit.

5. A circuit arrangement as claimed in claim 4, wherein the second unidirectional element is shunted by a capacitive circuit comprising a fourth capacitive element.

6. A circuit arrangement as claimed in claim 5, wherein the first feedback circuit is shunted by a second feedback circuit comprising a series arrangement of a third unidirectional element and a fourth unidirectional element, means connecting a common point of the third and the fourth unidirectional element to one end of the resonant circuit.

7. A circuit arrangement as claimed in claim 2 wherein the inverter further comprises;

a series arrangement of two switching elements, a control circuit coupled to the switching elements for alternately rendering the switching elements conducting and non-conducting at frequency f, and wherein the circuit section I forms a part of the control circuit.

8. A circuit arrangement as claimed in claim 4, wherein the first feedback circuit is shunted by a second feedback circuit comprising a series arrangement of a third unidirectional element and a fourth unidirectional element, and means connecting a common point of the third and the fourth unidirectional element to one end of the resonant circuit.

9. A circuit arrangement as claimed in claim 1 wherein the load circuit further comprises circuit arrangement or second lamp connection terminals and a third capacitive element and with said second series arrangement in shunt with said transformer secondary winding.

10. A circuit arrangement as claimed in claim 1 further comprising;

a rectifier circuit having input terminals for connection to terminals of an AC power supply and a first output terminal coupled to a first inverter input terminal, a third capacitive element interconnecting the inverter input terminals, wherein the inverter includes a series arrangement of first and second switching elements coupled to the inverter input terminals, and a control circuit coupled to the first and second switching elements for alternately rendering the switching elements conducting and non-conducting at the frequency f, a first feedback circuit including a series arrangement of first and second unidirectional elements coupling a second output terminal of the rectifier circuit to a second input terminal of the inverter, and means connecting a common circuit point of the first and second switching elements to a common circuit point of the first and second unidirectional elements via the first inductive element and the transformer primary winding.

11. A circuit arrangement as claimed in claim 10 wherein the first feedback circuit is shunted by a second feedback circuit comprising a series arrangement of third and fourth unidirectional elements, and means connecting a common point of the third and fourth unidirectional elements to one end of the resonant circuit.

12. A circuit arrangement as claimed in claim 10 further comprising a further capacitive element connected in shunt with the second unidirectional element.

13. A circuit arrangement as claimed in claim 1 wherein the transformer magnetizing inductance has a value such that the impedance of the load circuit is resistive during stable operation of the circuit arrangement.

* * * * *